United States Patent [19]
Gavish

[11] Patent Number: 5,671,396
[45] Date of Patent: Sep. 23, 1997

[54] M AND A FOR EXECUTING FIRMWARE OF AN ADD-ON FAX/MODEM CARD ON THE HOST PROCESSOR WHILE MAINTAINING COMPATIBILITY

[75] Inventor: Dan Gavish, Haifa, Israel

[73] Assignee: Intel Corporation, Santa Clara, Calif.

[21] Appl. No.: 349,617

[22] Filed: Dec. 5, 1994

[51] Int. Cl.$^6$ .................................................. G06F 3/00
[52] U.S. Cl. ........................ 395/500; 395/400; 395/468; 395/821
[58] Field of Search ................................. 395/284, 500, 395/733, 840, 828, 821; 379/100; 375/222; 358/400, 468, 469

[56] References Cited

U.S. PATENT DOCUMENTS 5,170,470   12/1992   Pindar et al. ........................ 395/828

*Primary Examiner*—Jack B. Harvey
*Assistant Examiner*—Jeffrey K. Seto
*Attorney, Agent, or Firm*—Blakely, Sokoloff, Taylor & Zafman

[57] ABSTRACT

A number of new interrupts, interrupt handlers, digital signal processing (DSP) tasks, registers and FIFOs are provided to an add-on fax/modem card and its host processor. The new FIFOs are used to facilitate rerouting of the transmit and receive data to the host for processing by the DSP task while maintaining compatibility, thereby off loading the add-on fax/modem card. The new interrupts and interrupt handling functions are used to facilitate the data rerouting, redirecting execution control between the host and the on-board processors with minimal latency. The new registers are used to facilitate the execution control redirection, transferring control and status information between the host and the on-board processors.

18 Claims, 9 Drawing Sheets

M AND A FOR EXECUTING FIRMWARE OF AN ADD-ON FAX/MODEM CARD ON THE HOST PROCESSOR WHILE MAINTAINING COMPATIBILITY

BACKGROUND OF THE INVENTION

1. Field of the Invention

The present invention relates to the field of computer systems. More specifically, the present invention relates to execution of firmware of add-on fax/modem cards.

2. Background Information

In order to support a wide range of functions and price/performance, many computer systems are equipped with a set of basic core functions, which in turn can be extended with more advance or special functions through add-on cards and/or peripherals. For example, the function of fax/modem is typically provided to desktop/laptop computers through add-on fax/modem cards.

Many of these fax/modem add-on cards include embedded firmware designed to be executed by on-board[1] digital signal processors (DSP) and/or controllers (hereinafter simply on-board processors). Consistent with the historical trend of the computer industry in general, each subsequent generation of fax/modem add-on cards have been offering more functions and/or better price/performance. In order to maintain compatibility, most fax/modem add-on cards maintain the same UART interfaces to the core functions from generation to generation.

[1] For the purpose of this application, "on-board" processors/controllers are integral processors/controllers of the modem/fax add-on cards, as opposed to the "main" processors of the computer systems, which shall be referred to as the "host" processors.

As microprocessor technology continues to improve, more and more computer systems are equipped with powerful microprocessors having abundant instruction processing power. If execution of some of the embedded firmware of add-on fax/modem cards, such as digital signal processing, can be moved from the on board processors to the host microprocessors, it will allow less capable on board processors to be used or the capacity be applied to support other new functions, leading to cheaper or more functional add-on fax/modem cards. However, the question of maintaining the same compatible UART interfaces between the basic core functions and the add-on fax/modem cards must be addressed. Furthermore, the latency involved in switching back forth between the basic core function and an add-on fax/modem card must also be addressed.

As will be disclosed in more detail below, the present invention provides a method and apparatus for executing firmware of an add-on fax/modem card on the host processor, while maintaining compatibility. Under the present invention, minimal latency well within the tolerance of fax/modem application is incurred. These and other advantages will be obvious from the descriptions to follow.

SUMMARY OF THE INVENTION

The desired results are advantageously achieved by providing a number of new interrupts, interrupt handlers, one or more digital signal processing (DSP) tasks, registers and FIFOs to an add-on fax/modem card and its host processor. The new FIFOs are used to facilitate rerouting of the transmit and receive data to the host for processing by the DSP task(s) while maintaining compatibility, thereby off loading the add-on fax/modem card. The new interrupts and interrupt handlers are used to facilitate the data rerouting, redirecting execution control between the host and the on-board processors with minimal latency. The new registers are used to facilitate the execution control redirections, transferring control and status information between the host and the on-board processors.

During a transmit operation, the host processor writes raw transmit data into the traditional UART transmit register of the add-on fax/modem card as in the prior art. However, unlike the prior art, the raw transmit data are rerouted to one of the new FIFOs on the fax/modem card, and execution control is redirected back to the host processor using selected ones of the newly provided interrupts, interrupt handlers and registers. In one embodiment, the transmit DSP task, executing on the host processor, reads back the raw transmit data back, processes the read back raw transmit data, and writes the encoded transmit data into another new FIFO of the fax/modem card. The transmit DSP task then causes execution control to be return to the on board processor, using other selected ones of the newly provided interrupts, interrupt handlers, and registers. The encoded transmit data are then moved to the conventional transmit shift register of the fax/modem card. As in the prior art, the encoded transmit data is then serialized and sent.

During a receive operation, encoded receive data are received into a conventional received shift register of the fax/modem card as in the prior art. However, unlike the prior art, the encoded receive data are moved to another new FIFO on the fax/modem card, and then execution control is transferred to the host processor in like manner as a transmit operation. In one embodiment, the receive DSP task reads in the encoded receive data, processes the read in encoded receive data, and writes the raw receive data into yet another new FIFO on the fax/modem card. The receive DSP task then causes execution control to be returned to the on board processor, also in like manner as a transmit operation. The raw receive data are then moved to the traditional UART receive register of the fax/modem card. As in the prior art, the raw receive data is then received by the host processor.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention.

Figure 1:
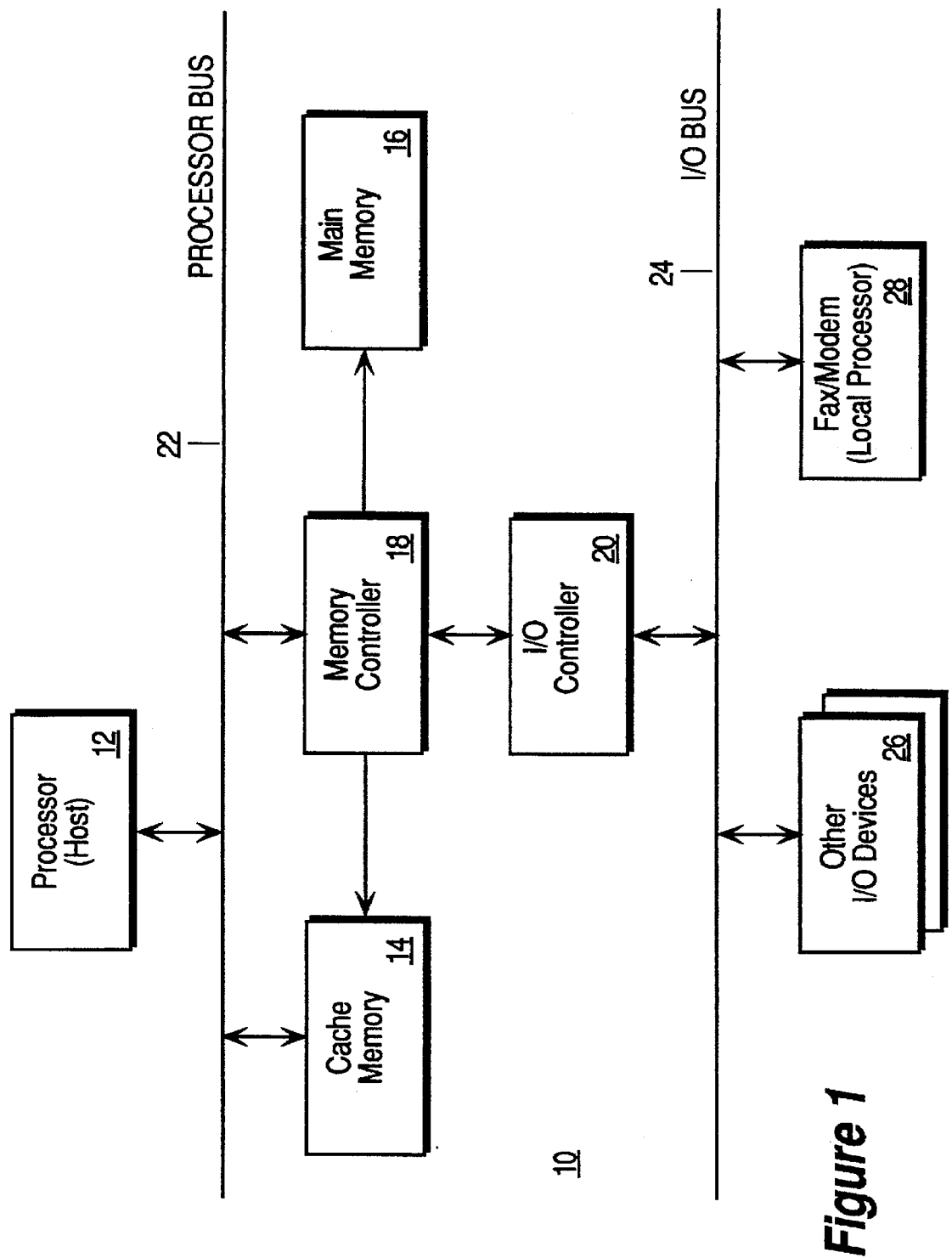
FIG. 1 illustrates an exemplary computer system incorporating the teachings of the present invention.

Referring now to FIG. 1, a block diagram illustrating an exemplary computer system 10 incorporating the teachings of the present invention is shown. Exemplary computer system 10 comprises host processor 12, cache memory 14, main memory 16, memory controller 18, and processor bus 22 interconnected to each other as shown. Furthermore, exemplary computer system 10 comprises I/O controller 20, a number of I/O devices 26, fax/modem add-on card 28 having a local processor, and I/O bus 24 interconnected to each other as shown. Memory and I/O controllers 18 and 20 are also interconnected to each other. Except for the teachings of the present invention incorporated by processor 12 and fax/modem 28, and the manner they use the other elements 14–26, these other elements 14–26 are intended to represent a broad category of similar elements found in many computer systems, whose constitutions and functions are well known, and will not be otherwise further described.

Figure 2:
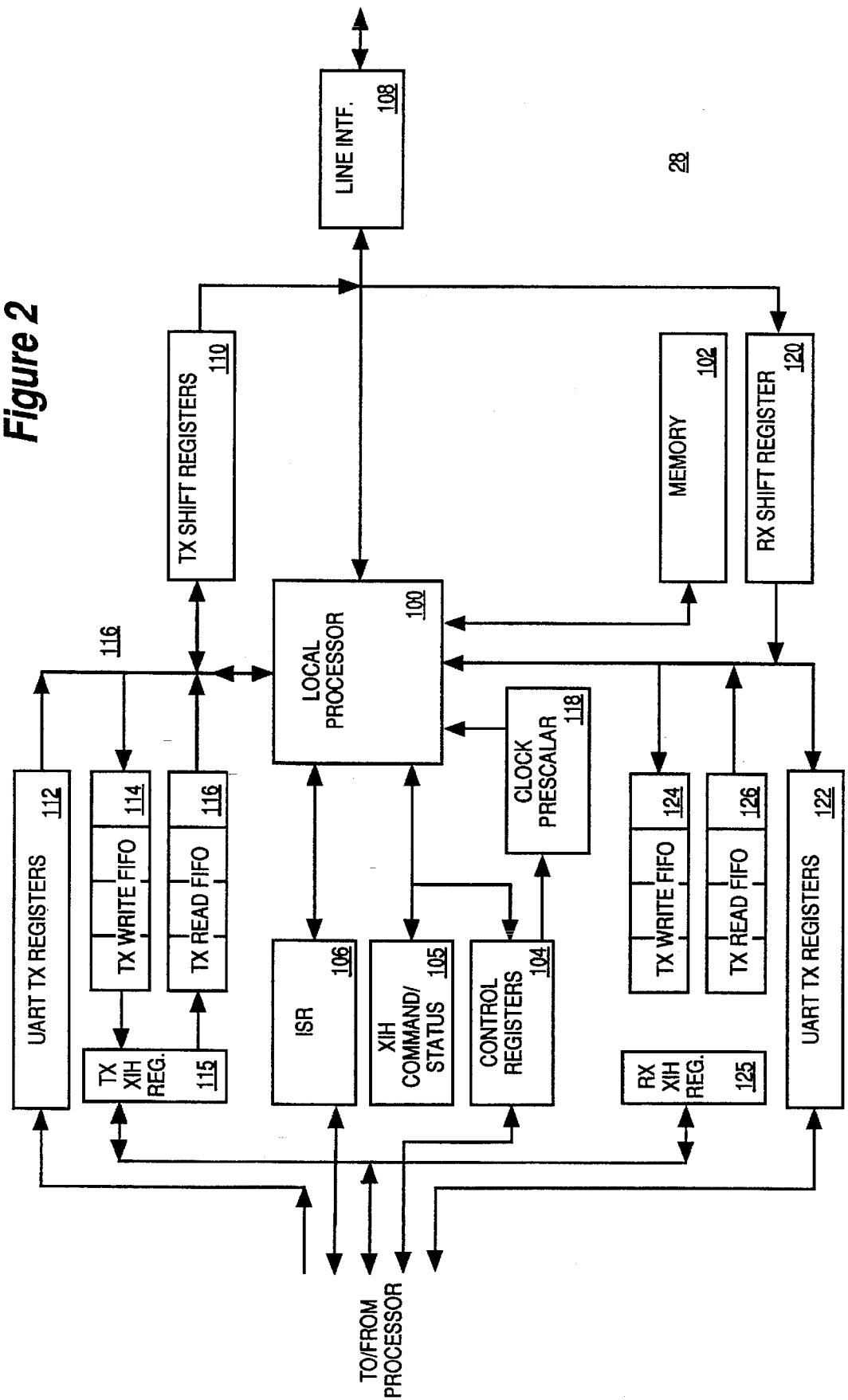
FIG. 2 illustrates one embodiment of add-on fax/modem card of FIG. 1.

FIG. 2 illustrates one embodiment of fax/modem add-on card 28 of the present invention in further detail. In addition to the earlier mentioned local processor 100, fax/modem 28 comprises traditional elements such as memory 102, control registers 104, dock 118, UART transmit (TX) and receive (RX) registers 112 and 122, TX and RX shift registers 110 and 120, and line interface 108. Additionally, under the present invention, fax/modem 28 comprises TX and RX read and write FIFOs 116, 114, 126 and 124, XIH command/status register 105 and interrupt service register (ISR) mechanism 106. These elements are coupled to each other as shown.

In one embodiment, fax/modem 28 further comprises TX and RX execute-in-host (XIH) registers 115 and 125 coupled to the TX and RX FIFOs 116, 114, 126 and 124 respectively. Control registers 104 include in particular a number of configuration registers, and ISR 106 include in particular a host ISR register. Under this embodiment, configuration registers of control registers 104 are mapped to a configuration address space, whereas TX and RX XIH register 115 and 125, XIH command/status register 105 and host ISR register of ISR mechanism 106 are mapped into a real time address space. Both the configuration and real time address spaces are externally accessible by the host processor 12.

The constitutions of elements 100–126 are well known and will not be further described. The functions of these elements 100–126, in particular the manner they cooperate with each other under the present invention will be described in more detail below with additional references to the remaining figures.

Figure 3:
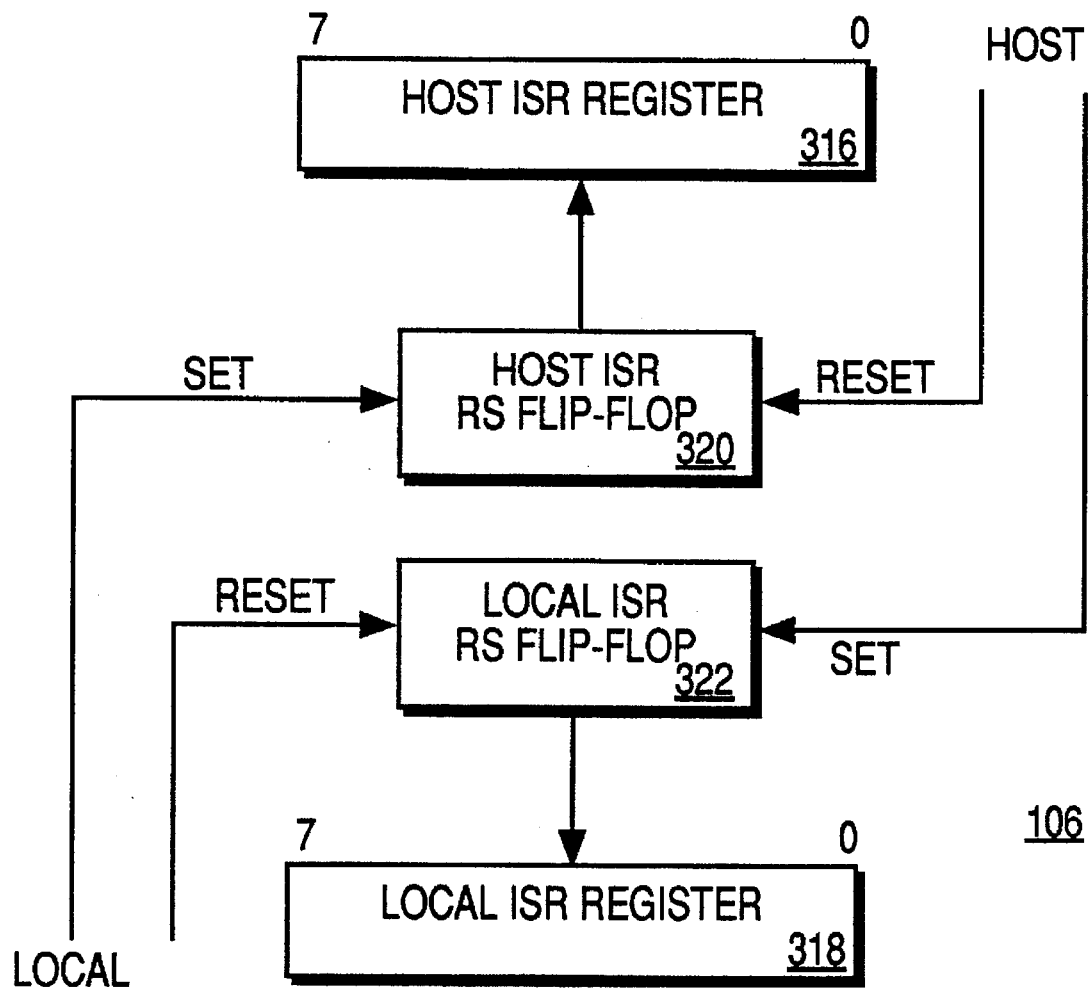
FIG. 3 illustrates one embodiment of the interrupt mechanism of FIG. 2 in further detail.

FIG. 3 illustrates one embodiment of ISR mechanism 106 of fax/modem add-on card 28 of the present invention in further detail. As shown, ISR 106 comprises host and local ISR registers 316 and 318, and host and local ISR flip flops 320 and 322 correspondingly coupled to each other. By setting and resetting host and local ISR flip flops 320 and 322, contents of host and local ISR registers 316 and 318 are updated, thereby triggering host and local interrupts for the host and local processors 12 and 100 as desired. Host ISR flip flop 320 is set by local processor 100 and reset by host processor 12, whereas local ISR flip flop 322 is set by host processor 12 and reset by local processor 100.

Figure 4:
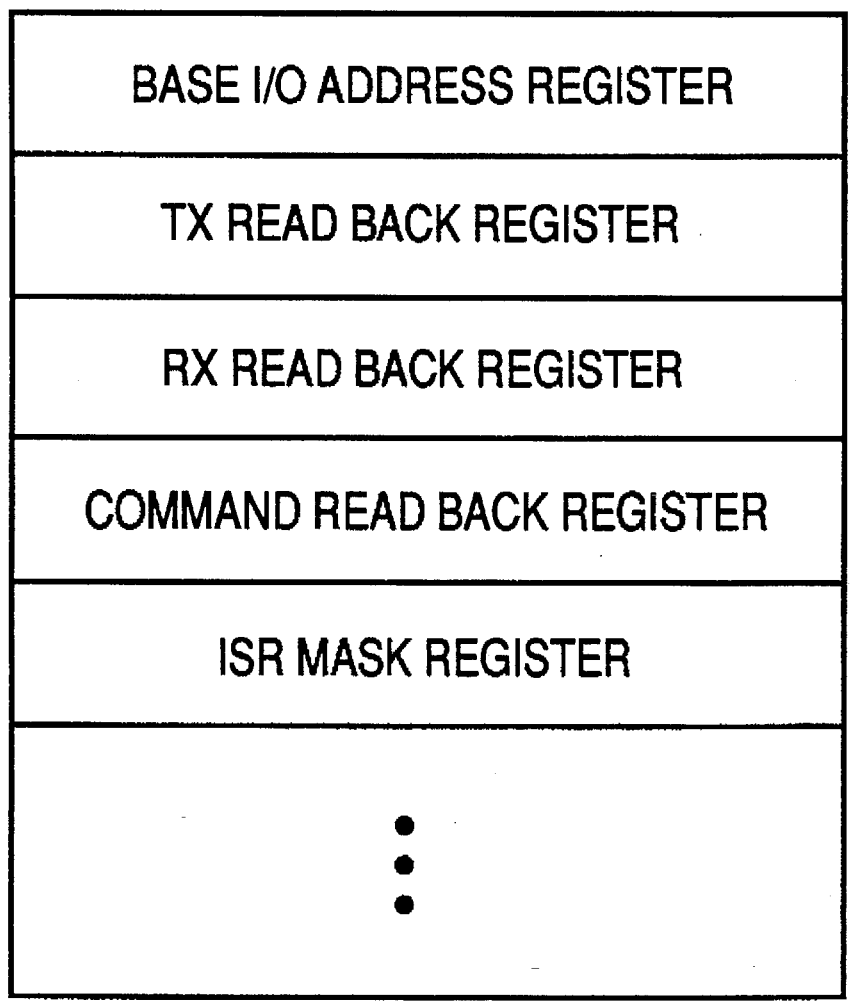
FIG. 4 illustrates one embodiment of the relevant control registers of FIG. 2 in further detail.

FIG. 4 illustrates one embodiment of control registers 104 of fax/modem add-on card 28 of the present invention in further detail. As shown, under this embodiment, control registers 104 comprises host base I/O address register 302 for storing the starting address of the real time address space to facilitate accesses to TX and RX XIH registers 115 and 125, command/status register 105 and host ISR register 316 described earlier. Under this embodiment, control registers 104 further comprise an ISR mask register 310 for storing an ISR mask to be used when "interpreting" the content of host ISR register 316. Under this embodiment, control registers 104 further comprise TX, RX and Command readback registers 304–308. These readback registers 304–308 are used by host processor 12 to read back the data written into TX and RX RD FIFOs 116 and 126 and as well as commands written into command/status register 105 for validation during initialization testing.

Figure 5:
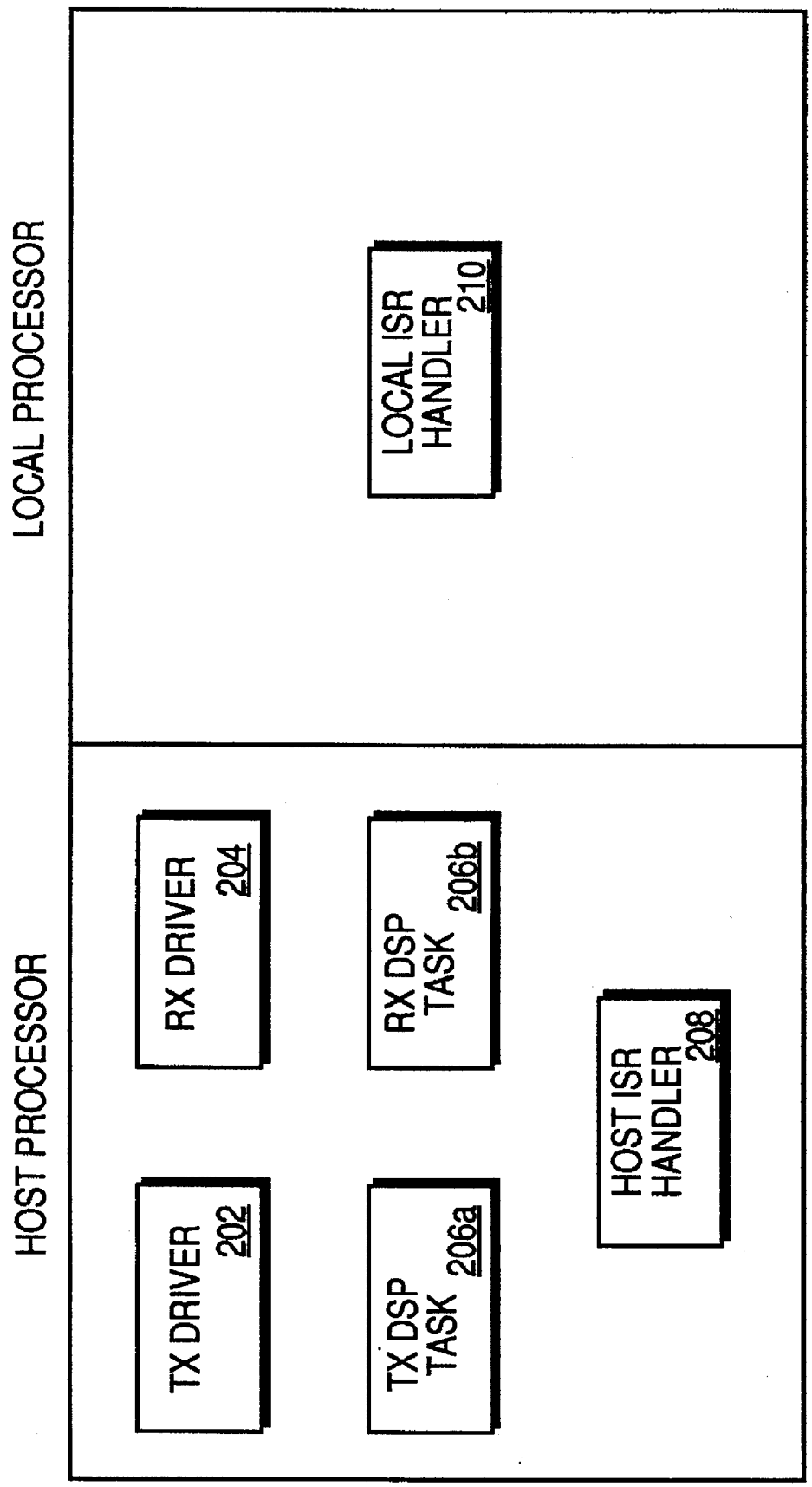
FIG. 5 illustrates a logical view of one embodiment of the memory spaces of the host and on board processors.

FIG. 5 illustrates one embodiment of the relevant software tasks executed by host processor 12 and local processor 100. As shown, host processor 12 executes a TX and a RX driver 202 and 204. Furthermore, under the illustrated embodiment, host processor 12 executes a TX and a RX DSP task 206a and 206b, and a host ISR handler 208. Local processor 100 executes a local ISR handler 210. The functions of these drivers 202–204, tasks 206a–206b, and handler 210 will be described below as an integral part of the manner they cooperate to implement the teachings of the present invention.

Figure 6:
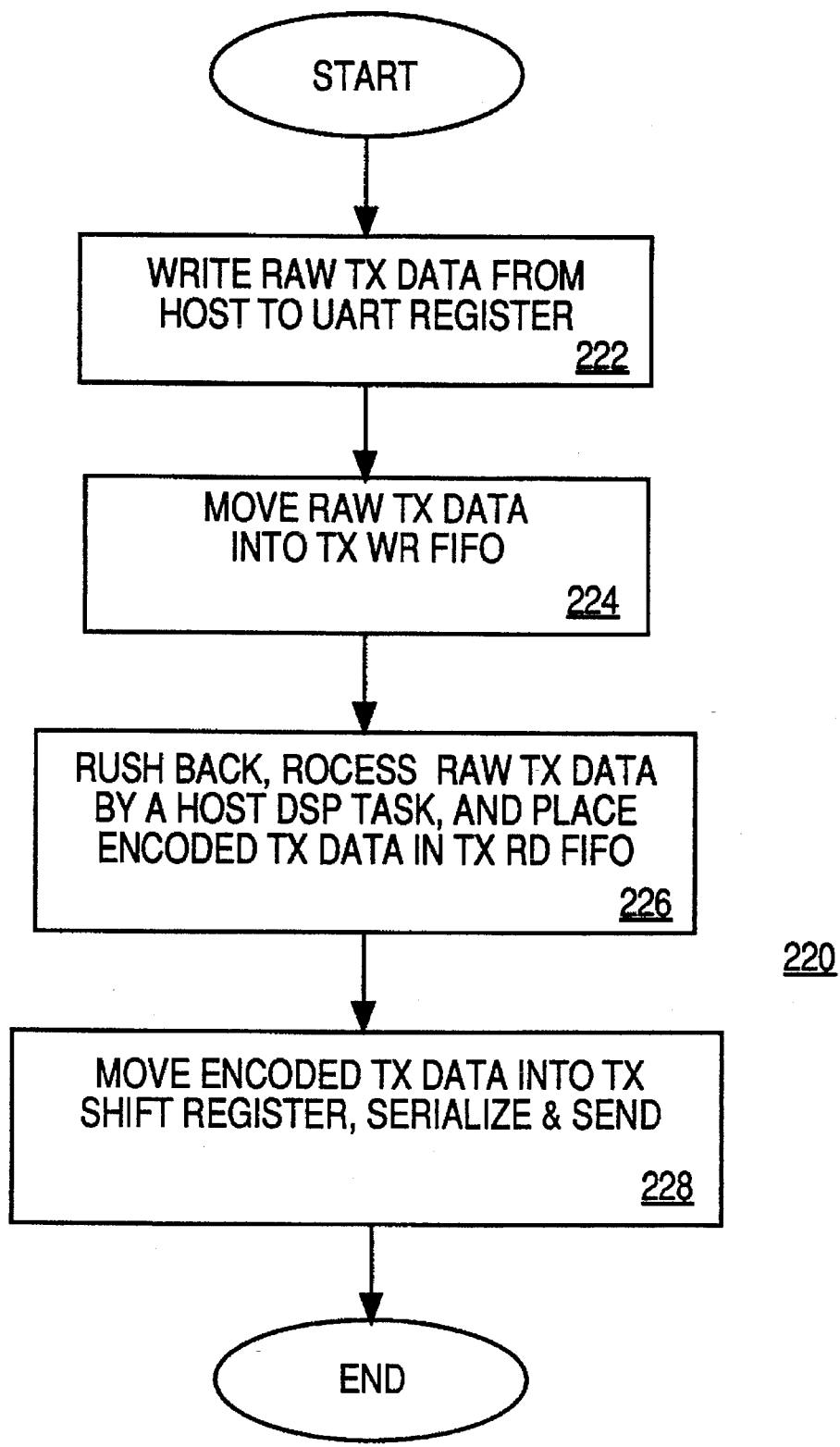
FIGS. 6-7 illustrate the method steps for transmitting and receiving data under the present invention.

FIG. 6 illustrates the method steps 220 of the present invention for transmitting data. As shown, initially, similar to conventional fax/modem add-on cards, TX driver 202 executing on host processor 12 moves the raw TX data from the host memory 14 and 16 to the traditional UART TX register 112, and transfers execution control to the local processor 100 by triggering a local interrupt, step 222. However, unlike conventional fax/modem add-on cards, local ISR handler 210 causes the raw TX data to be moved into the newly provided TX write FIFO 114, and execution control to be redirected back to the host processor 12 though an host interrupt, step 224. Upon given control by host ISR handler 208, TX DSP task 206a executing on host processor 12 reads back the raw TX data, through TX XIH register 115, and processes the read back raw TX data, step 226. Furthermore, TX DSP task 206a places the encoded TX data into newly provided TX read FIFO 116, through TX XIH register 115, and transfers control to the local processor 100 again by triggering a local interrupt, step 226. In response, local ISR handler 210 causes the encoded data from TX read FIFO 116 to be moved into conventional TX shift register 110, step 226. Similar to conventional fax/modem add-on cards, the encoded TX data are then serialized and sent, step 228.

Figure 7:
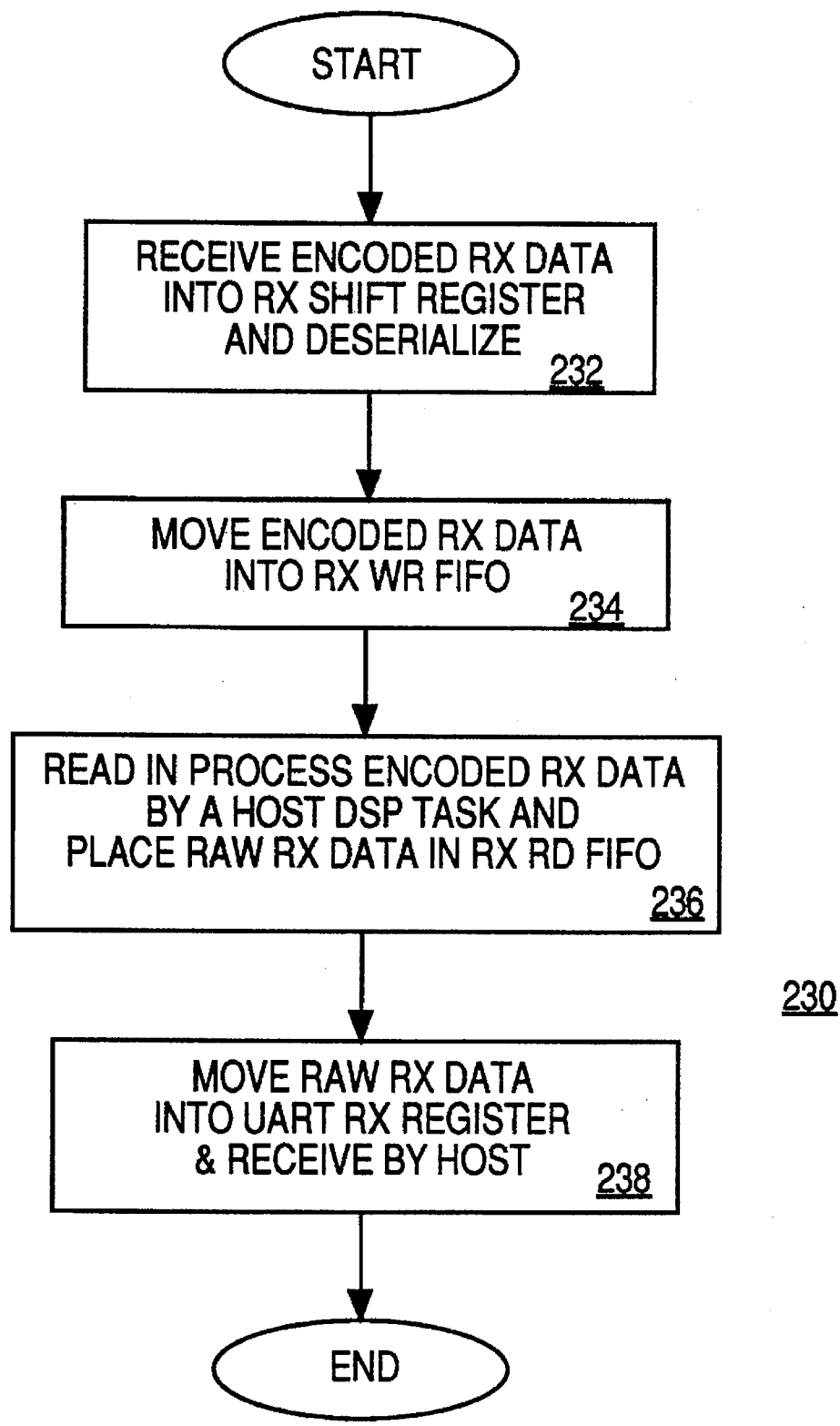

FIG. 7 illustrates the method steps 220 of the present invention for receiving data. As shown, initially, similar to conventional fax/modem add-on cards, encoded RX data are received into conventional RX shift register 120, and deserialized, step 232. However, unlike conventional fax/modem add-on cards, the deserialized encoded RX data are moved from RX shift register 120 to the newly provided RX write FIFO 124, and execution control is transferred to the host processor 12 through a host interrupt, step 234. Upon given control by the host ISR handler 208, RX DSP task 206b reads the encoded RX data into the host memory 14 and 16, through RX XIH register 125, and processes the encoded RX data, step 236. Furthermore, RX DSP task 206b places the decoded raw RX data into newly provided RX read FIFO 126, through RX XIH register 125, and transfers control back to the local processor 100 again by triggering a local interrupt, step 236. In response, local ISR handler 210 causes the decoded raw RX data to be moved from RX read FIFO 116 to conventional UART RX register 122, and execution control to be transferred to the host processor 12 again, step 236. Upon given control by host ISR handler 208, similar to conventional fax/modem add-on cards, RX driver 204 reads in the decoded RX data from the conventional UART RX register 122, step 238.

Figure 8:
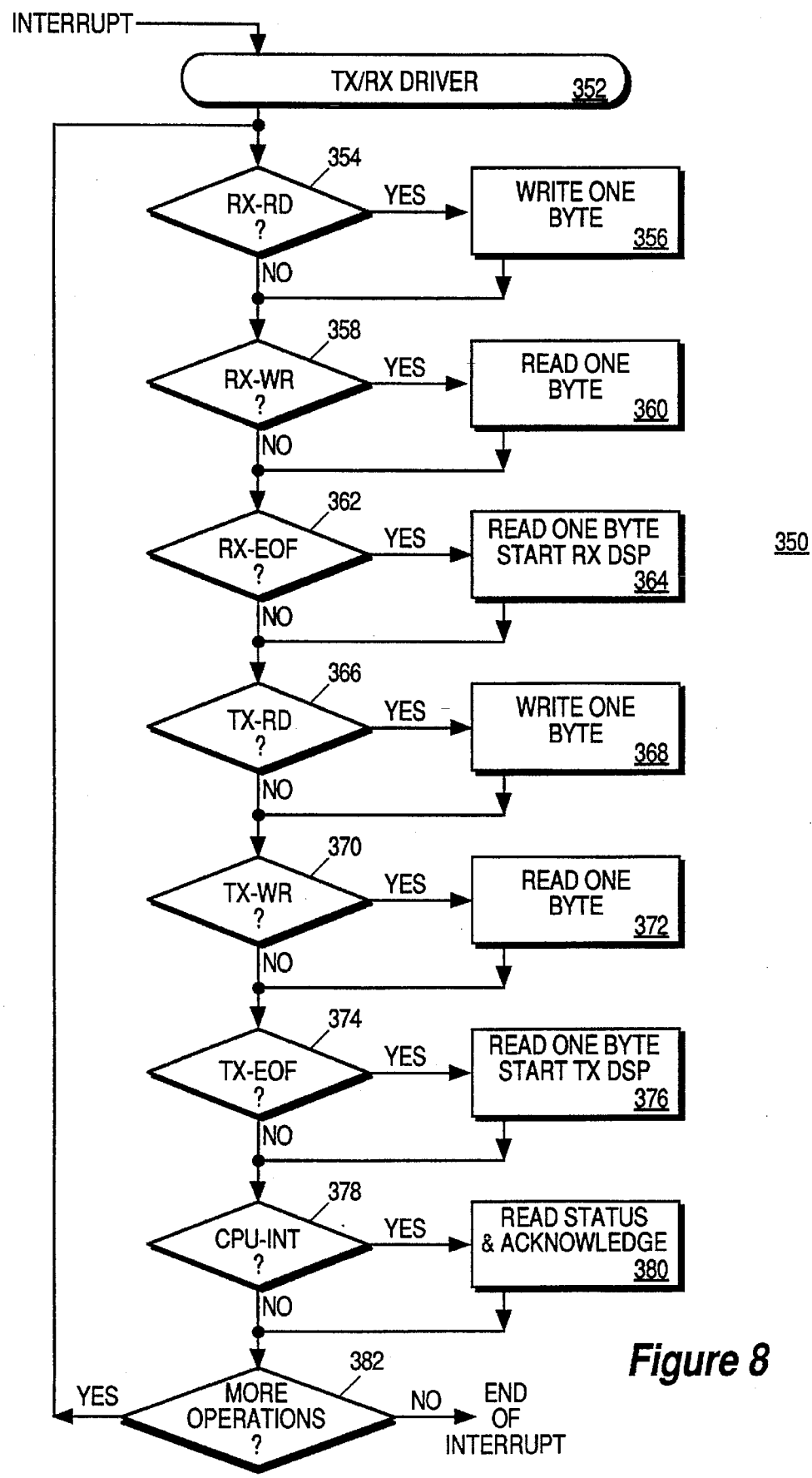
FIGS. 8-9 illustrate one embodiment each of the operation flow of the host and local interrupt handlers.

FIG. 8 illustrates one embodiment of the operational logic of host ISR handler 208. As shown, initially host ISR handler 208 causes conventional TX/RX driver to be executed, step 352. If the control and status information stored in command and status register 105 indicates that the operation to be performed is a RX read, host ISR handler 208 causes one byte to be written from host memory 14 and 16 to the newly provided RX read FIFO 126, step 356. If it is a RX write operation that is to be performed, host ISR handler 208 causes one byte to be read from the newly provided RX write FIFO 124 into host memory 14 and 16, step 360. If it is a RX end of transfer (EOF) that is to be performed, host ISR handler 208 causes one byte to be read from the newly provided RX write FIFO 124 into host memory 14 and 16. Furthermore host ISR handler 208 causes RX DSP task 206b to be started, step 364.

If the control and status information stored in command and status register 105 indicates that the operation to be performed is a TX read, host ISR handler 208 causes one byte to be written from host memory 14 and 16 to the newly provided TX read FIFO 116, step 368. If it is a TX write operation that is to be performed, host ISR handler 208 causes one byte to be read from the newly provided RX write FIFO 114 into host memory 14 and 16, step 372. If it is a TX end of transfer (EOF) that is to be performed, host ISR handler 208 causes one byte to be read from the newly provided TX write FIFO 114 into host memory 14 and 16. Furthermore host ISR handler 208 causes TX DSP task 206a to be started, step 376.

If the control and status information stored in command and status register 105 indicates that it is a control operation to be performed (CPU-int), host ISR handler 208 reads the appropriate status, if any, step 380. Furthermore, host ISR handler 208 acknowledges as appropriate, step 380. Lastly, if there are more operations to be performed, host ISR handlers 208 repeats steps 354–380. Host ISR handler 208 repeats step 354–380 until it can determine at step 382 that all appropriate operations have been performed.

Figure 9:
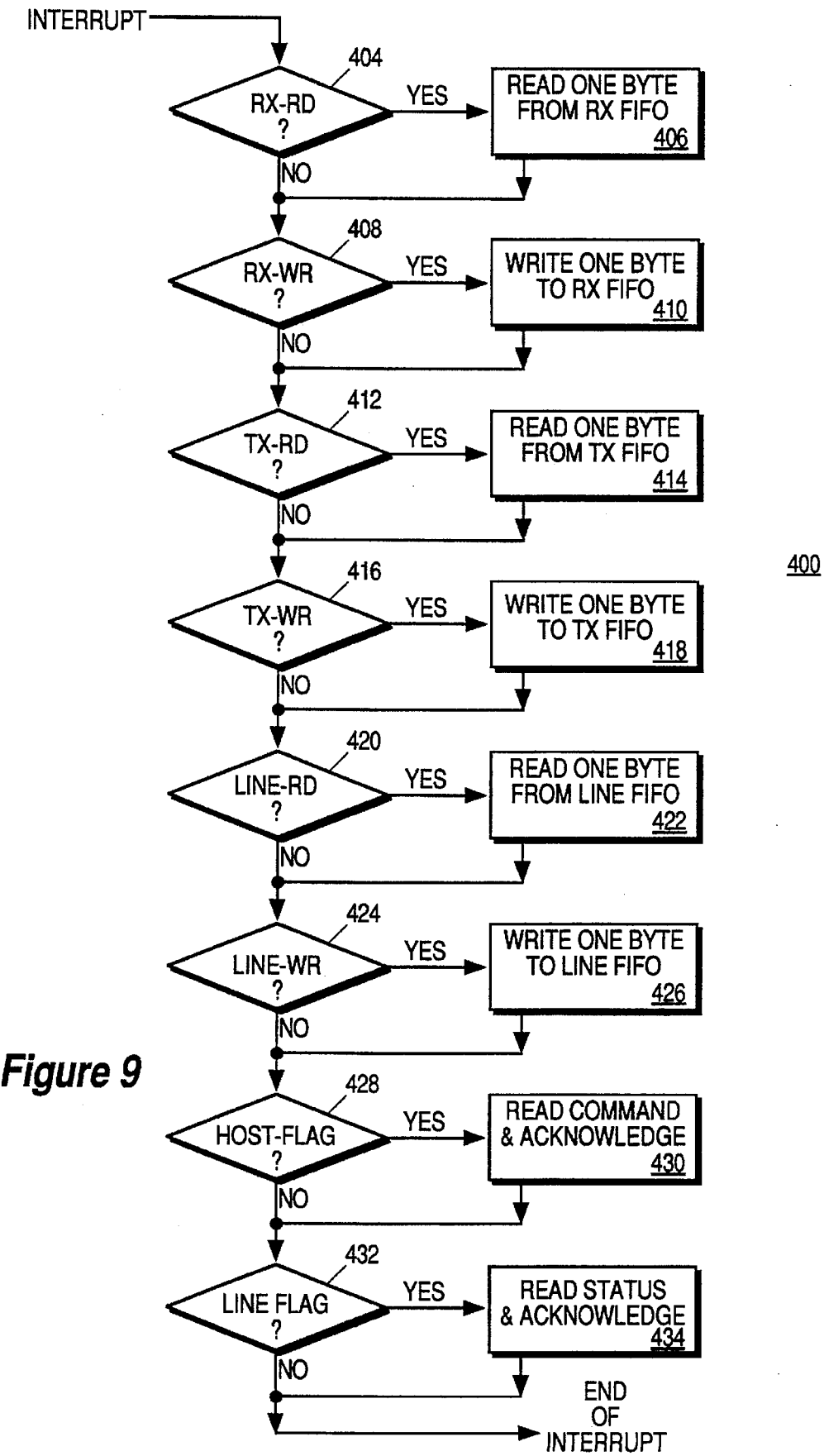

FIG. 9 illustrates one embodiment of the operational logic of local ISR handler 210. As shown, if the control and status information stored in command and status register 105 indicates that the operation to be performed is a RX read, local ISR handler 210 causes one byte to be read from the newly provided RX read FIFO 126, step 406. If it is a RX write operation that is to be performed, local ISR handler 210 causes one byte to be written into the newly provided RX write FIFO 124, step 410.

If the control and status information stored in command and status register 105 indicates that the operation to be performed is a TX read, local ISR handler 210 causes one byte to be read from the newly provided TX read FIFO 116, step 414. If it is a TX write operation that is to be performed, local ISR handler 210 causes one byte to be written into the newly provided RX write FIFO 114, step 418.

If the control and status information stored in command and status register 105 indicates that the operation to be performed is a Line read, local ISR handler 210 causes one byte to be read from the conventional RX shift register 120, step 422. If it is a Line write operation that is to be performed, local ISR handler 210 causes one byte to be written into the conventional TX shift register 110, step 426.

If the control and status information stored in command and status register 105 indicates that it is a host related control operation to be performed (Host flag), local ISR handler 210 reads the appropriate command, if any, step 430. Furthermore, local ISR handler 210 acknowledges as appropriate, step 430. Lastly, if the control and status information stored in command and status register 105 indicates that it is a line related control operation to be performed (Line flag), local ISR handler 210 reads the appropriate status, if any, step 434. Furthermore, local ISR handler 210 acknowledges as appropriate, step 434.

Thus, a method and apparatus for executing firmware of an add-on fax/modem cards on the host processor while maintaining compatibility has been described. It will be appreciated that under the method and apparatus of the present invention, compatibility is advantageously maintained without modifications to the conventional UART interfaces and the conventional TX and RX drivers executing on the host processor. However, "new" TX and RX drivers may write directly into the TX RD FIFOs as well as read directly from the RX WR FIFO.

While the present invention has been described in terms of the above embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a computer system comprising a host processor and a fax/modem, a method for transmitting data via the fax/modem while maintaining compatibility, said method comprising the steps of:

a) transferring raw transmit data from the host processor to the fax/modem through a first conventional host processor-fax/modem interface;

b) moving and transferring the raw transmit data from the fax/modem back to the host processor through a second unconventional host processor-fax/modem interface;

c) processing and encoding the transferred back raw transmit data on the host processor, and transferring the encoded transmit data from the host processor to the fax/modem through the second unconventional host processor-fax/modem interface; and d) moving and transmitting the encoded transmit data through a conventional fax/modem-line interface.

2. In a computer system comprising a host processor and a fax/modem, a method for transmitting data via the fax/modem while maintaining compatibility, said method comprising the steps of:

a) writing raw transmit data from memory of the host processor to a conventional host processor-fax/modem interfacing register of the fax/modem;

b) moving the raw transmit data from the conventional host processor-fax/modem interfacing register to a first host processor-fax/modem redirection FIFO of the fax/modem;

c) reading the raw transmit data from the first host processor-fax/modem redirection FIFO of the fax/modem back to the memory of the host processor;

d) processing and encoding the transfer back raw transmit data on the host processor, and writing the encoded transmit data from the memory of the host processor to a second host processor-fax/modem redirection FIFO of the fax/modem; and e) moving the encoded transmit data from the second host processor-fax/modem redirection FIFO of the fax/ modem to a conventional fax/modem-line interface of the fax/modem, and then transmitting the encoded transmit data.

3. In a computer system comprising a host processor and a fax/modem, a method for receiving data via the fax/modem while maintaining compatibility, said method comprising the steps of:
   a) receiving encoded receive data into the fax/modem through a conventional fax/modem-line interface;
   b) moving and transferring the encoded receive data from the fax/modem to the host processor through a first unconventional host processor-fax/modem interface;
   c) processing and decoding the encoded receive data on the host processor, and transferring the decoded receive data from the host processor to the fax/modem through the first unconventional host processor-fax/modem interface; and
   d) moving and transferring the decoded receive data from the fax/modem back to the host processor through a second conventional host process-fax/modem interface.

4. In a computer system comprising a host processor and a fax/modem, a method for receiving data via said fax/modem while maintaining compatibility, said method comprising the steps of:
   a) receiving encoded receive data into a conventional fax/modem-line interface of the fax/modem;
   b) moving the received encoded receive data into a first host processor-fax/modem redirection FIFO of the fax/modem;
   c) reading the encoded receive data from the first host processor-fax/modem redirection FIFO into memory of the host processor;
   d) processing and decoding the encoded receive data on the host processor, and writing the decoded receive data from the memory of the host processor to a second host processor-fax/modem redirection FIFO of the fax/modem; and
   e) moving the decoded receive data from the second host processor-fax/modem redirection FIFO of the fax/modem to a conventional host processor-fax/modem interfacing register of the fax/modem, and reading the decoded receive data from the conventional host processor-fax/modem interfacing register of the fax/modem back into the memory of the host processor.

5. A computer system comprising:
   a) host processor means for transferring raw transmit data to fax/modem means, coupled to the host processor means, through a first conventional host processor-fax/modem interface, transferring the raw transmit data back to the host processor means through a second unconventional host processor-fax/modem interface, processing and encoding the transferred back raw transmit data, and transferring the encoded transmit data to the fax/modem means through the second unconventional host processor-fax/modem interface.

6. The computer system as set forth in claim 5, wherein said computer system further comprising:
   b) the fax/modem means for moving the raw transmit data from the first conventional host processor-fax/modem interface to the second unconventional host processor-fax/modem interface, moving the encoded transmit data from the second unconventional host processor-fax/modem interface into the conventional fax/modem-line interface, and transmitting the encoded transmit data.

7. A computer system comprising:
   a) host processor means for writing raw transmit data into a first host processor-fax/modem interfacing register of fax/modem means coupled to the host processor means, reading the raw transmit data from a first host processor-fax/modem redirection FIFO of the fax/modem means into memory of the host processor means, processing and encoding the raw transmit data, and writing the encoded transmit data to a second host processor-fax/modem redirection FIFO of the fax/modem means.

8. The computer system as set forth in claim 7, wherein the host processor means comprises:
   a.1) a host processor for executing programs;
   a.2) memory coupled to the host processor for storing data;
   a.3) an interrupt handler to be executed by the host processor for causing raw transmit data to be written into the first host processor-fax/modem interfacing register, the raw transmit data to be read from the first host processor-fax/modem redirection FIFO into the memory, and the encoded transmit data to be written into the second host processor-fax/modem redirection FIFO; and
   a.4) a digital signal processing task to be executed by the host processor for processing and encoding the raw transmit data.

9. The computer system as set forth in claim 7, wherein the computer system further comprising:
   b) the fax/modem means for moving the raw transmit data from the host processor-fax/modem interfacing register to the first host processor-fax/modem redirection FIFO, moving the encoded transmit data from the second host processor-fax/modem redirection FIFO into the conventional fax/modem-line interface of the fax/modem means, and transmitting the encoded transmit data.

10. The computer system as set forth in claim 9, wherein the fax/modem means comprises:
   b.1) the host processor-fax/modem interfacing register for storing the raw transmit data;
   b.2) the first host processor-fax/modem redirection FIFO for storing the raw transmit data being redirected back to the host processor means;
   b.3) the second host processor-fax/modem redirection FIFO for storing the encoded transmit data;
   b.4) the conventional fax/modem-line interface for storing the encoded transmit data;
   b.5) a local processor for executing programs; and
   b.6) a local interrupt handler to be executed by the local processor for causing the raw transmit data to be moved from the host processor-fax/modem interfacing register to the first host processor-fax/modem redirection FIFO, the decoded transmit data to be moved from the second host processor-fax/modem redirection FIFO to the conventional fax/modem-line interface, and the stored encoded transmit data to be transmitted.

11. A computer system comprising:
   a) host processor means coupled to fax/modem means for transferring received encoded receive data from the fax/modem means through a first unconventional host processor-fax/modem interface, processing and decoding the encoded receive data, and transferring the decoded receive data to the fax modem means through the first unconventional host processor-fax/modem interface, and transferring back the decoded receive data from the fax/modem means through a second conventional host processor-fax/modem interface.

12. The computer system as set forth in claim 11, wherein said computer system further comprises:
   b) the fax/modem means for receiving the encoded receive data through a conventional fax/modem-line interface, moving the received encoded receive data from the conventional fax/modem-line interface to the first unconventional host processor-fax/modem interface, and moving the decoded received data from the first unconventional host processor-fax/modem interface to the second conventional host processor-fax/modem interface.

13. A computer system comprising:
   a) host processor means for reading received encoded receive data from a first host processor-fax/modem redirection FIFO into memory of the host processor means, processing and decoding the encoded receive data, writing the decoded receive data into a second host processor-fax/modem redirection FIFO, and reading the decoded receive data back from a host processor-fax/modem interfacing register into the memory.

14. The computer system as set forth in claim 13, wherein the host processor means comprises:
   a.1) a host processor for executing programs;
   a.2) memory coupled to the host processor for storing data;
   a.3) a host interrupt handler to be executed by the host processor for causing the received encoded receive data to be read from the first host processor-fax/modem redirection FIFO into the memory, the decoded receive data to be written into the second host processor-fax/modem redirection FIFO, and the decoded receive data to be read back from the host processor-fax/modem interfacing register into the memory; and
   a.4) a digital signal processing task to be executed by the host processor for processing and decoding the encoded receive data.

15. The computer system as set forth in claim 14, wherein said computer system further comprises:
   b) the fax/modem means for receiving the encoded receive data through a conventional fax/modem-line interface of the fax/modem means, moving the received encoded receive data from the conventional fax/modem-line interface into the first host processor-fax/modem redirection FIFO of the fax/modem means, and moving the decoded receive data from the second host processor-fax/modem redirection FIFO of the fax/modem means to the host processor-fax/modem interfacing register of the fax/modem means.

16. The computer system as set forth in claim 15, wherein the fax/modem means comprises:
   b.1) the conventional fax/modem-line interface for receiving and storing the received encoded receive data;
   b.2) the first host processor-fax/modem redirection FIFO for storing the received encoded receive data being redirected to the host processor means;
   b.3) the second host processor-fax/modem redirection FIFO for storing the decoded receive data;
   b.4) the conventional host processor-fax/modem interfacing register for storing the decoded receive data;
   b.5) a local processor for executing programs; and
   b.6) a local interrupt handler to be executed by the local processor for causing the received encoded receive data to be moved from the conventional fax/modem-line interface to the first host processor-fax/modem redirection FIFO, and the decoded version of the received data to be moved from the second host processor-fax/modem redirection FIFO to the host processor-fax/modem interfacing register.

17. A fax/modem comprising:
   a) a host processor-fax/modem interfacing register for storing raw transmit data received from a host processor coupled to the fax/modem;
   b) a first host processor-fax/modem redirection FIFO for storing the raw transmit data being redirected back to the host processor;
   c) a second host processor-fax/modem redirection FIFO for storing a decoded version of the transmit data received from the host processor;
   d) a conventional fax/modem-line interface for storing the encoded transmit data;
   e) a local processor for executing programs; and
   f) a local interrupt handler to be executed by the local processor for causing the raw transmit data to be moved from the host processor-fax/modem interfacing register to the first host processor-fax/modem redirection FIFO, the decoded transmit data to be moved from the second host processor-fax/modem redirection FIFO to the conventional fax/modem-line interface, and the stored encoded transmit data to be transmitted.

18. A fax/modem comprising:
   a) a conventional fax/modem-line interface for receiving and storing received encoded receive data;
   b) a first host processor-fax/modem redirection FIFO for storing the received encoded receive data being redirected to a host processor coupled to the fax/modem;
   c) a second host processor-fax/modem redirection FIFO for storing a decoded version of the receive data received from the host processor;
   d) a conventional host processor-fax/modem interfacing register for storing the decoded receive data;
   e) a local processor for executing programs; and
   f) a local interrupt handler to be executed by the local processor for causing the received encoded receive data to be moved from the conventional fax/modem-line interface to the first host processor-fax/modem redirection FIFO, and the decoded version of the received data to be moved from the second host processor-fax/modem redirection FIFO to the host processor-fax/modem interfacing register.

\* \* \* \* \*

UNITED STATES PATENT AND TRADEMARK OFFICE
CERTIFICATE OF CORRECTION

PATENT NO. : 5,671,396
DATED : September 23, 1997
INVENTOR(S) : Dan Gavish

It is certified that error appears in the above-identified patent and that said Letters Patent is hereby corrected as shown below:

In column 3 at line 24 delete "dock" and insert --clock--

Signed and Sealed this

Seventh Day of July, 1998

Attest:

BRUCE LEHMAN

Attesting Officer

Commissioner of Patents and Trademarks